US008775824B2

(12) United States Patent
Kershaw et al.

(10) Patent No.: US 8,775,824 B2
(45) Date of Patent: Jul. 8, 2014

(54) PROTECTING THE SECURITY OF SECURE DATA SENT FROM A CENTRAL PROCESSOR FOR PROCESSING BY A FURTHER PROCESSING DEVICE

(75) Inventors: Daniel Kershaw, Cambridge (GB); Nigel Charles Paver, Austin, TX (US)

(73) Assignee: ARM Limited, Cambridge (GB)

( * ) Notice: Subject to any disclaimer, the term of this patent is extended or adjusted under 35 U.S.C. 154(b) by 1438 days.

(21) Appl. No.: 12/003,858

(22) Filed: Jan. 2, 2008

(65) Prior Publication Data

US 2009/0172411 A1   Jul. 2, 2009

(51) Int. Cl.
*G06F 21/72* (2013.01)
*G06F 21/57* (2013.01)

(52) U.S. Cl.
USPC ........... 713/189; 713/164; 713/165; 713/193; 726/27

(58) Field of Classification Search
USPC ............... 713/189, 164, 165, 193; 726/27
See application file for complete search history.

(56) References Cited

U.S. PATENT DOCUMENTS

| | | | |
|---|---|---|---|
| 5,845,327 A | 12/1998 | Rickard et al. | |
| 6,684,305 B1 | 1/2004 | Deneau | |
| 7,340,547 B1* | 3/2008 | Ledebohm | 710/260 |
| 7,650,515 B2 | 1/2010 | Ito et al. | |
| 7,661,104 B2 | 2/2010 | Watt et al. | |
| 2002/0069316 A1* | 6/2002 | Mattison | 711/103 |
| 2003/0028751 A1 | 2/2003 | McDonald et al. | |
| 2003/0140245 A1* | 7/2003 | Dahan et al. | 713/200 |
| 2003/0172265 A1 | 9/2003 | Vu et al. | |

(Continued)

FOREIGN PATENT DOCUMENTS

| | | |
|---|---|---|
| CN | 1711524 A | 12/2005 |
| EP | 1983497 | 10/2008 |

(Continued)

OTHER PUBLICATIONS

Office Action mailed May 10, 2011 in co-pending U.S. Appl. No. 12/003,857.

(Continued)

*Primary Examiner* — Ashok Patel
*Assistant Examiner* — Gary Gracia
(74) *Attorney, Agent, or Firm* — Nixon & Vanderhye P.C.

(57) ABSTRACT

A data processing apparatus comprising: a data processor for processing data in a secure and a non-secure mode, said data processor processing data in said secure mode having access to secure data that is not accessible to said data processor in said non-secure mode, and processing data in said secure mode being performed under control of a secure operating system and processing data in said non-secure mode being performed under control of a non-secure operating system; and a further processing device for performing a task in response to a request from said data processor, said task comprising processing data at least some of which is secure data; wherein said further processing device is responsive to receipt of a signal to suspend said task to initiate: processing of said secure data using a secure key; and storage of said processed secure data to a non-secure data store; and is responsive to receipt of a signal to resume said task to initiate: retrieval of said processed secure data from said non-secure data store; and restoring of said processed secure data using said secure key; wherein said secure key is securely stored such that it is not accessible to other processes operating in said non-secure mode.

21 Claims, 8 Drawing Sheets

(56) References Cited

U.S. PATENT DOCUMENTS

| | | | |
|---|---|---|---|
| 2003/0212808 A1* | 11/2003 | Chen | 709/230 |
| 2004/0153672 A1 | 8/2004 | Watt et al. | |
| 2004/0153807 A1* | 8/2004 | Watt et al. | 714/35 |
| 2004/0158727 A1* | 8/2004 | Watt et al. | 713/193 |
| 2004/0177243 A1* | 9/2004 | Worley, Jr. | 713/2 |
| 2004/0177269 A1* | 9/2004 | Belnet et al. | 713/200 |
| 2004/0215898 A1 | 10/2004 | Arimilli et al. | |
| 2005/0160210 A1* | 7/2005 | Watt et al. | 710/269 |
| 2005/0200504 A1* | 9/2005 | Timmermans et al. | 341/50 |
| 2005/0216701 A1 | 9/2005 | Taylor | |
| 2006/0015754 A1* | 1/2006 | Drehmel et al. | 713/193 |
| 2006/0064546 A1 | 3/2006 | Arita et al. | |
| 2006/0090084 A1* | 4/2006 | Buer | 713/189 |
| 2006/0179259 A1* | 8/2006 | Kershaw et al. | 711/154 |
| 2006/0200802 A1 | 9/2006 | Mott et al. | |
| 2006/0203725 A1* | 9/2006 | Paul et al. | 370/229 |
| 2006/0285682 A1* | 12/2006 | Sarangarajan et al. | 380/28 |
| 2006/0294370 A1 | 12/2006 | Greenspan | |
| 2007/0199046 A1 | 8/2007 | O'Brien | |
| 2007/0204085 A1* | 8/2007 | Orlando et al. | 710/261 |
| 2007/0220276 A1* | 9/2007 | Croxford et al. | 713/193 |
| 2007/0277036 A1* | 11/2007 | Chamberlain et al. | 713/171 |
| 2008/0034350 A1* | 2/2008 | Conti | 717/124 |
| 2008/0052534 A1* | 2/2008 | Harada et al. | 713/190 |
| 2008/0066075 A1* | 3/2008 | Nutter et al. | 718/107 |
| 2008/0072004 A1* | 3/2008 | Kershaw | 711/163 |
| 2008/0072051 A1* | 3/2008 | Kaabouch et al. | 713/176 |
| 2008/0098205 A1 | 4/2008 | Dolve et al. | |
| 2008/0109903 A1* | 5/2008 | Werner et al. | 726/22 |
| 2008/0189500 A1* | 8/2008 | Jennings et al. | 711/164 |
| 2008/0222383 A1 | 9/2008 | Spracklen et al. | |
| 2008/0240420 A1* | 10/2008 | Oxford | 380/28 |
| 2008/0263621 A1* | 10/2008 | Austerlitz et al. | 725/139 |
| 2009/0007275 A1* | 1/2009 | Gehrmann | 726/27 |
| 2009/0013196 A1 | 1/2009 | Ito et al. | |
| 2009/0028343 A1* | 1/2009 | Sprunk | 380/286 |
| 2009/0049443 A1* | 2/2009 | Powers et al. | 718/100 |
| 2009/0106832 A1* | 4/2009 | Haga et al. | 726/16 |
| 2009/0138623 A1* | 5/2009 | Bosch et al. | 710/14 |
| 2009/0164797 A1* | 6/2009 | Kramer | 713/186 |
| 2009/0320048 A1* | 12/2009 | Watt et al. | 719/319 |
| 2011/0078699 A1* | 3/2011 | Donlin et al. | 718/104 |

FOREIGN PATENT DOCUMENTS

| | | |
|---|---|---|
| JP | 2006-340347 | 12/1996 |
| JP | 2001-318787 | 11/2001 |
| JP | 2004-171563 | 6/2004 |
| JP | 2004-287628 | 10/2004 |
| JP | 2006-033114 | 2/2006 |
| JP | 2006-506751 | 2/2006 |
| JP | 2006-145852 | 6/2006 |
| JP | 2007-304847 | 11/2007 |
| WO | WO 99/61982 | 12/1999 |
| WO | WO 99/61989 | 12/1999 |
| WO | WO 2004/046916 | 6/2004 |
| WO | WO 2004/046924 | 6/2004 |
| WO | WO 2005/101213 | 10/2005 |
| WO | WO 2006/126686 | 11/2006 |
| WO | WO 2006/131921 | 12/2006 |
| WO | WO 2007/091492 | 8/2007 |
| WO | WO2007/091492 A1 | 8/2007 |

OTHER PUBLICATIONS

Office Action mailed Oct. 19, 2011 in co-pending U.S. Appl. No. 12/003,857.

Translation of Japanese official action, mailed May 15, 2012 in corresponding Japanese Application No. JP 2009-000321.

English translation of Chinese Official Action dated Aug. 2, 2012 in application No. Chinese Application No. 200910002315.9.

English Translation of Chinese Official Action mailed Feb. 25, 2013 in corresponding Chinese Application No. 200910002315.9.

David Lie et al., Implementing an Untrusted Operating System on Trusted Hardware, SOSP '03, Oct. 2003, 15 pgs.

Herwin Chan et al., Process Isolation for Reconfigurable Hardware, ERSA, CSREA Press, 2006 pp. 164-170.

John R. Hauser et al., Proceedings of the IEEE Symposium on Field-Programmable Custom Computing Machines (FCCM '97, Apr. 1997), pp. 24-33.

UK Search Report dated Feb. 23, 2009 for GB 0820711.0.

UK Search Report dated Feb. 20, 2009 for GB 0820439.8.

UK Search Report dated Jan. 19, 2009 for GB 081825.1.

U.S. Appl. No. 12/000,005, Paver et al., filed Dec. 6, 2007.

U.S. Appl. No. 12/003,857, Paver et al, filed Jan. 2, 2008.

M. Vuletic et al, "Multithreaded Virtual-Memory-Enabled Reconfigurable Hardware Accelerators" IEEE Conf. Field Programmable Technology, Dec. 2006, pp. 197-204.

* cited by examiner

PROTECTING THE SECURITY OF SECURE DATA SENT FROM A CENTRAL PROCESSOR FOR PROCESSING BY A FURTHER PROCESSING DEVICE

TECHNICAL FIELD

The technology relates to data processing and in particular to processing secure and non-secure data using additional processing devices to perform tasks under control of a first data processor.

BACKGROUND

It is known to use accelerators or co-processors in conjunction with a main processor to increase performance, the accelerators or co-processors performing tasks requested by the main processor. Although it is clear that the provision of additional processing power can increase performance a possible drawback of such a system is the overhead associated with the communication between the processor and the accelerator. In situations, for example, where both secure and non-secure data is processed under the control of secure operating systems and non-secure operating systems, the communication overheads associated with managing the security status of the data being transferred between the processor and accelerator can be very high. In such cases it may only be advantageous to send large tasks to the accelerator to be performed, but to not send tasks that take only a few tens or even hundreds of cycles having as much or more communication overhead associated with them as they would have processing performance gained.

SUMMARY

A first aspect provides a data processing apparatus comprising: a data processor for processing data in a secure and a non-secure mode, said data processor processing data in said secure mode having access to secure data that is not accessible to said data processor in said non-secure mode, and processing data in said secure mode being performed under control of a secure operating system and processing data in said non-secure mode being performed under control of a non-secure operating system; and a further processing device for performing a task in response to a request from said data processor, said task comprising processing data at least some of which is secure data; wherein said further processing device is responsive to receipt of a signal to suspend said task to initiate: processing of said secure data using a secure key; and storage of said processed secure data to a non-secure data store; and is responsive to receipt of a signal to resume said task to initiate: retrieval of said processed secure data from said non-secure data store; and restoring of said processed secure data using said secure key; wherein said secure key is securely stored such that it is not accessible to other processes operating in said non-secure mode.

The inventors recognized that the use of a further processing device to perform particular tasks for a data processor that can operate in either a secure or non-secure mode can have large communication overheads in the case that the data processed by the further processing device includes secure data. This is because this secure data must be kept isolated from the non-secure mode of the data processor and management of secure data is generally done by the secure operating system of the data processor. However, calling the secure operating system to manage the secure data being processed by the further processing device whenever the task being performed by the further processing device is interrupted and needs to be suspended would require many operating cycles and would therefore be very costly in terms of performance. The technology described in this application addresses this problem by providing the further processing device itself with the functionality that enables it to cause the secure data it is processing to be processed before it is stored to a non-secure data store that is accessible to the data processor. This processing is done using a key that is not accessible to other non-secure processes. By providing the further processing device itself with this functionality, the possibility of maintaining the security of the secure data without the intervention of the secure operating system is provided. Furthermore, when the task the further processing device was processing is to be resumed, the secure data can be restored under control of the further processing device using the secure key not accessible to other non-secure processes and then the state of the further processing device can be restored and the task resumed with the data processor itself which may be operating in non-secure mode only having controlled access to the secure data.

Thus, the security of the data processed by the further processing device is maintained in an efficient manner by the further processing device itself and overheads associated with sending a task to a further processing device are reduced and thus, smaller tasks can be sent with performance benefits.

In some embodiments, said processing of said secure data comprises encryption of said secure data using said secure key and said restoring of said processed secure data comprises decryption of said encrypted secure data using said secure key, said secure key being securely stored within a device performing said encryption and decryption.

An efficient way of protecting the secure data is to encrypt it under control of the further processing device before storing it to a non-secure store. In this way the data processor itself cannot access this secure data.

In some embodiments prior to initiating encryption of said data said further processing device initiates generation of a secure signature from said data and initiates encryption of said secure signature and storing of said secure signature along with said secure data; and in response to receipt of said signal to resume said task said further processing device initiates retrieval of said encrypted secure signature and decryption of said encrypted secure signature and following decryption of said encrypted secure data initiates generation of said secure signature from said decrypted encrypted data and comparison of said generated secure signature with said decrypted secure signature; and in response to said generated secure signature not matching said decrypted secure signature said further processing device issues an signal to said data processor to indicate that said data has been tampered with; and in response to said generated secure signature matching said decrypted secure signature said further processing device resumes said task using said decrypted data.

Although the secure data can simply be encrypted to protect it from access by non-secure processes, it may be advantageous to generate a secure signature from the data and then encrypt this secure signature with the data. This signature can then be used on decryption to determine whether or not the stored encrypted data has been tampered with. If the secure signature generated following decryption does not match the stored encrypted secure signature then an abort signal can be issued to the data processor to inform it that the data has been tampered with. If the secure signature does match then the processing can proceed. In this way, not only can the secure data be securely stored while the process is interrupted its integrity can be verified.

In other embodiments the secure signature is generated from the encrypted data rather than from the unencrypted data by: following encrypting of said data said further processing device initiates generation of a secure signature from said encrypted data, and initiates encrypting and storing of said secure signature along with said encrypted secure data; and in response to receipt of said signal to resume said task said further processing device initiates retrieval of said encrypted secure signature and decryption of said encrypted secure signature, and initiates generation of said secure signature from said encrypted data and comparison of said generated secure signature with said decrypted secure signature; and in response to said generated secure signature not matching said decrypted secure signature said further processing device issues a signal to said data processor to indicate that said data has been tampered with; and in response to said generated secure signature matching said decrypted secure signature said further processing device decrypts said encrypted data and resumes said task using said decrypted data.

In some embodiments said processing of said secure data comprises generation of a secure signature from said data and encryption of said secure signature using said secure key, and said restoring of said processed secure data comprises decryption of said encrypted secure signature, and generation of said secure signature from said retrieved data and comparison of said generated secure signature with said decrypted secure signature; and in response to said generated secure signature not matching said decrypted secure signature said further processing device issues a signal to said data processor to indicate that said data has been tampered with; and in response to said generated secure signature matching said decrypted secure signature said further processing device resumes said task using said retrieved data.

It may be that the secure data that is being processed does not need protecting from viewing itself as it is not comprehensible outside of the further processing device. However, it may be important that it is not tampered with as tampering with it may be a way of trying to gain access to secure information. In such a case, the data itself is not encrypted, however, a secure signature is generated and this can be used to check that the data has not been tampered with.

In some embodiments, said encryption of said secure data and said generation of said signature are performed using a same algorithm.

Where the encryption of the secure data is done using a crypto-engine produced specifically for this function then in order to reduce the overhead of adding this engine it may be advantageous to produce the signature (a hash for example) using the same algorithm as is used to encrypt the secure data.

In some embodiments, said device performing said encryption and decryption is said further processing device.

If the further processing device performs the encryption and decryption itself then it is clear that the security of the secure data is enhanced as it does not leave this device until it is itself encrypted and thus access to the secure data is easy to control.

In some embodiments, said further processing device comprises a cryptography processing device, said cryptography processing device performing cryptography processing of data using at least one key, said secure data being encrypted by said secure key comprising said at least one key.

This technique is particularly useful when applied to cryptography processing devices. These use keys to encrypt and decrypt data and it is clearly important that these keys are not accessible to non-secure mode. Thus, it is important with these further processing devices that the secure data comprising these cryptography keys is kept secure. Furthermore, these devices already comprise cryptographic functionality and as such encrypting the secure data (the cryptographic keys that are used for encrypting data during processing) can be performed using these devices and using the secure key that the further processing device uses for this function. In this way, the secure data can be encrypted and decrypted using the functionality of the further processing device itself. Thus, there is little area overhead associated with including this function.

In some embodiments, said device performing said encryption and decryption device is a cryptography processing device connected to said further processing device by a dedicated data communication path that is not accessible to other devices.

Although, in some embodiments the further processing device itself performs cryptographic function, in others it can be performed by a separate cryptographic device. In such a case, the data path for communicating the secure data to this cryptographic device must be a secure data path that is dedicated for this purpose and is not accessible by others processors.

In some embodiments, said further processing device comprises circuitry for performing a function other than cryptography, said further processing device comprising additional cryptography circuitry for encrypting and decrypting said secure data, said further processing device comprising a secure storage location for said secure key.

If the further processing device is not a cryptographic processing device, then it can either use a separate cryptographic processing device as was previously mentioned or it can be given additional cryptographic circuitry so that it can encrypt and decrypt the secure data without the secure data ever leaving the further processing device except in an encrypted state. In such a case, the further processing device comprises a storage location for the secure key such that this secure key is available within the device for encrypting and decrypting and yet is not available to any other device.

In some embodiments, said further processing device comprises a write only storage location for said secure key.

It may be advantageous to store the secure key on the further processing device in a write only storage location. In this way it can be updated by other devices but cannot be read by them.

In some embodiments, said secure key is stored in said data processing apparatus under control of said data processor operating in a secure mode such that it is only accessible to said data processor operating in a secure mode.

It may be that the secure key is retrieved from the secure memory of the data processing apparatus for example under control of the data processor operating in the secure mode. This can be advantageous where it is desirable to update the secure key from time to time. This is acceptable from a security point of view providing it is stored in a secure storage location such that it can only be manipulated in secure mode by other devices. In some embodiments it may only be accessible in a secure privileged mode, this would provide even greater security.

In some embodiments, said secure key is set at manufacture and is permanently securely stored in said device performing said encryption and decryption of said secure data such that it is not accessible to other devices.

An alternative to accessing keys in secure mode is to store it permanently within the device that encrypts the secure data and make it inaccessible to other devices. This is a simple way of ensuring that the secure key is kept safe within the device and is not accessible to the outside. However, it does mean that the key can never be changed or updated An alternative way of generating and storing the secure key is to have a random number generator within the encryption and decryption device, the random number generator generating and storing the secure key at reset. In other embodiments a pseudo random number generator may be used in which a secret set of existing signals or values are combined and a number generated from this combination.

Although the non-secure data store can comprise a number of different things, in some embodiments it comprises a non-secure portion of memory.

In some embodiments, said signal to suspend said task is generated by said data processor in response to an interrupt or an exception.

Although the signal to suspend the task can be generated in response to a number of things in some embodiments it is generated in response to an interrupt or exception.

In some embodiments, said signal to suspend said task is generated by said data processor in response to a signal indicating a switch of context of said data processor from operation in one of said secure or non-secure mode to the other of said secure or non-secure mode.

Context switching of the data processor from secure mode to non-secure mode involves the other data processing means suspending processing of the further processing means and its state being stored to memory such that it can recommence processing when the data processor switches back to the mode it was in.

In such a case, it is important that security of the secure data that it was processing is maintained. This is done without using the secure operating system of the data processor but by using encryption and decryption means that are controlled by the further processing means itself. Thus, the security of the data is maintained by the further processing device itself and no call of the secure operating system that is expensive in performance is needed to control the security of the data.

In some embodiments, said request to perform said task is issued from said data processor operating in said non-secure mode.

If the request to perform the task is issued from the data processor in the non-secure mode, then the processing by the further processing device of secure data must clearly be kept isolated from the data processor itself as the data processor itself is operating in non-secure mode. In such a case, the encryption of the secure data before it is stored out of the further processing means in response to a request to suspend processing is important in maintaining the security without involving the data processor itself.

In some embodiments, said data processor is configured to issue said request to perform said task to said further processing device in response to program code said data processor is executing in non-secure mode.

Embodiments allow code such as user code being executed by the data processor in a non-secure mode such as a non-secure user mode to call the further processing means itself to execute code which includes secure data without the need to involve the secure operating system. This is very advantageous in allowing secure data to be processed in an efficient manner. Uses of this can be for example in cryptographic processing of data using secure keys without the need for the secure operating system to be involved.

In some embodiments, said further processing device comprises non-programmable hardware.

The further processing device may comprise a simple non-programmable hardware device which makes it particularly secure as it cannot be hacked by user software. Thus, provided the secure data remains within this device and only leaves it in encrypted form its security is assured.

In some embodiments, said further processing device is configured to process program code not under control of an operating system.

The further processing device may be a simple device that does not comprise an operating system and this makes the control of secure data within it straight forward. It also makes it an efficient device that can perform predefined processing steps very efficiently.

A further aspect provides a method of processing data on a data processing apparatus comprising a data processor for processing data in a secure and a non-secure mode, said data processor processing data in said secure mode having access to secure data that is not accessible to said data processor in said non-secure mode, and processing data in said secure mode being performed under control of a secure operating system and processing data in said non-secure mode being performed under control of a non-secure operating system; and a further processing device for performing a task in response to a request from said data processor, said task comprising processing data at least some of which is secure data; said method comprising the steps of: processing data on said data processor; sending a request from said data processor to said further processing device to perform a task, said task comprising processing data at least some of which is secure data; commencing said task on said further processing device; sending a signal to suspend said task to said further processing device; said further processing device suspending said task and initiating encryption of said secure data using a secure key and storage of said encrypted secure data to a non-secure data store in response to receipt of said signal to suspend said task; generating a signal from said data processor instructing said further processing device to resume said task; said further processing device retrieving said encrypted secure data from said non-secure data store and decrypting said encrypted secure data using said secure key in response to said signal, said secure key being securely stored within said device performing said encryption and decryption such that it is not accessible to other devices.

DESCRIPTION

Figure 1:
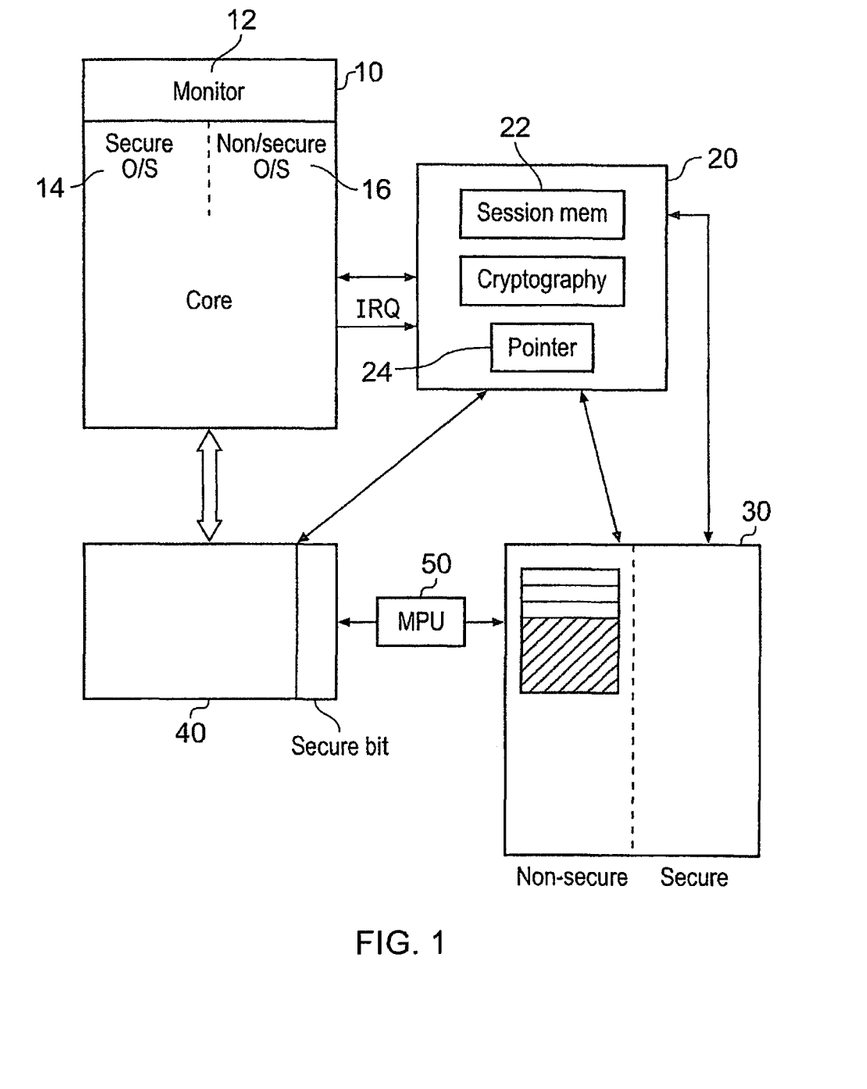
FIG. 1 schematically shows a data processing apparatus according to an example embodiment.

FIG. 1 schematically shows a processor core 10 and an accelerator 20. The system is provided with a monitor program 12 which executes at least partially in a monitor mode. A security status flag is write accessible only within the monitor mode and may be written by the monitor program. The monitor program is responsible for managing all changes between the secure domain and the non-secure domain in either direction. From a view external to the core the monitor mode is always secure and the monitor program is in secure memory. The monitor mode 12 can be considered a secure processing mode, since the secure status flag may be changed in this mode and monitor program in the monitor mode 12 has the ability to itself set the security status flag it effectively provides the ultimate level of security within the system as a whole.

The monitor mode has the highest level of security access in the system and is the only mode entitled to switch the system between the non-secure domain and the secure domain in either direction. Thus, all domain switches take place via a switch to the monitor mode and the execution of the monitor program within the monitor mode.

Within the non-secure domain there is provided a non-secure operating system 16 which runs a plurality of non-secure application programs which execute in co-operation with the non-secure operating system 16. In the secure domain, a secure kernel program is provided. The secure kernel program 14 can be considered to form a secure operating system. Typically such a secure kernel program 16 will be designed to provide only those functions which are essential to processing activities which must be provided in the secure domain such that the secure kernel 14 can be as small and simple as possible since this will tend to make it more secure.

When switching between the secure and non-secure modes, the monitor mode is always invoked to control the security of the data and ensure that data that is secure is never available to the non-secure side. To enter monitor mode a secure privileged mode is first entered. Monitor mode cannot be entered from a non-privileged secure mode except in response to a secure interrupt.

FIG. 1 also shows an accelerator 20 that is linked to core 10 and that in this embodiment comprises a crypto-engine. The crypto-engine 20 is called by core 10 to perform cryptographic functions for it. It may be that even when operating in non-secure mode it is desirable to encrypt some data. In such a case, the crypto-engine is called to do this and it performs cryptographic functions using secure keys. Clearly these secure keys should not be available to the non-secure side and although the crypto-engine may be a non-programmable hardware device which makes it very secure if the cryptographic process is interrupted for some reason then if the state from the cryptographic engine is to be saved so the processing can be resumed there is a security issue here as saving out the state of the cryptographic process might make it available to the non-secure side if this is performed when the non-secure operating system is controlling the core. However, if the secure operating system needs to be called in order to manage the security of the data then there will be a large latency associated with interrupting this application. In the present embodiment, the crypto-engine's functionality is used to encrypt the secure data such as the keys used during its processing using a session key 22 that is stored within crypto-engine 20. In this embodiment, session key 22 is stored within crypto-engine 20 when the processor core is operating in the secure mode under control of the secure operating system 14 whereupon the core instructs the crypto-engine to load the session key from a secure portion of memory from within memory 30. The session key 22 is stored in a write only location such that external processes trying to hack into crypto-engine 20 cannot read it.

Thus, in response to an interrupt from the core 10 indicating that the application that the crypto-engine is processing should be suspended, crypto-engine 20 suspends processing of its data and uses its cryptographic functionality to encrypt the secure data that it was processing using session key 22. The state of the crypto-engine along with the encrypted secure data and the non-encrypted non-secure data is then stored out to non-secure portion of memory 30 at a location indicated by pointer 24.

When the core wishes to resume the application that it had tasked cryto-engine 20 with performing it sends a signal to crypto-engine 20 indicating this, whereupon crypto-engine 20 can leave its state and the stored data from memory 30 by accessing the location indicated by pointer 24. It can then decrypt the encrypted data using session key 22 and can then resume processing. In this way, a non-secure application running under control of non-secure operating system on core 10 can task a crypto-engine to perform cryptography using secure keys and can allow this application to be interrupted without the need to invoke monitor mode to control the security status of the secure data.

Figure 2:
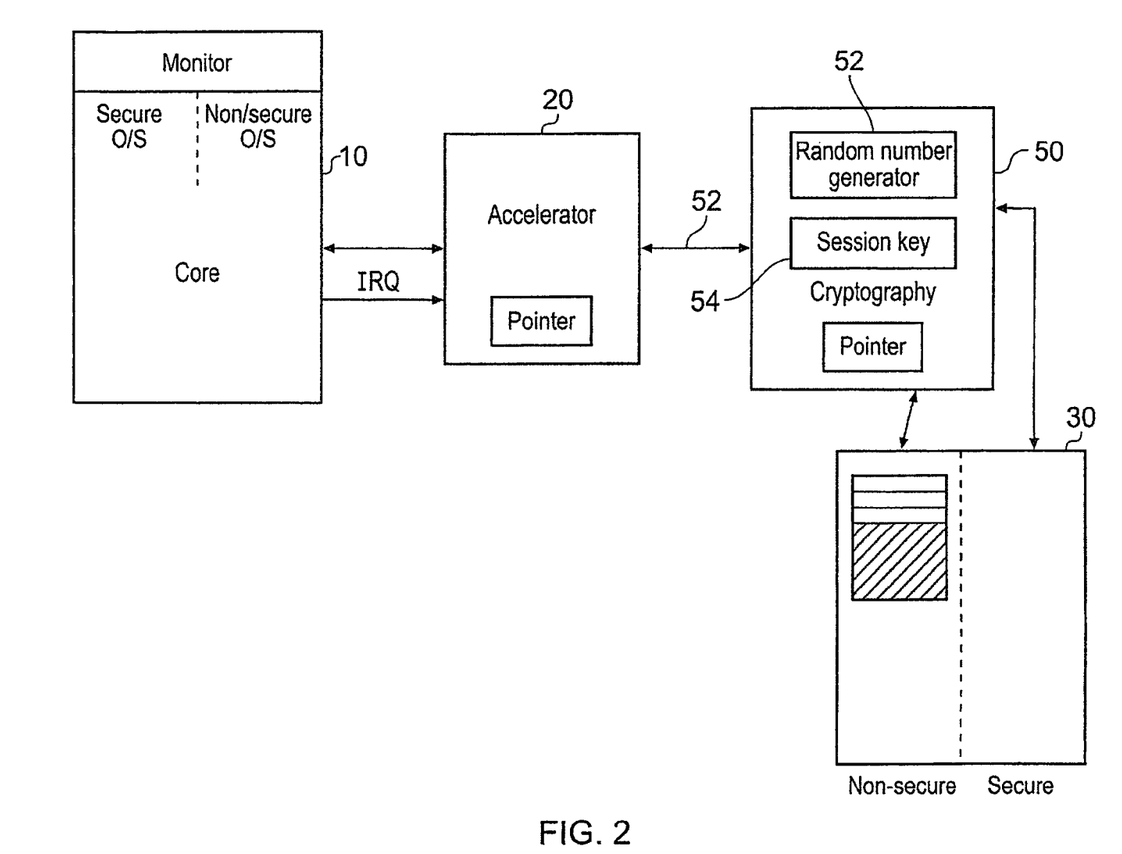
FIG. 2 schematically shows a data processing apparatus having a processor, an accelerator and a separate cryptographic device according to an example embodiment.

FIG. 2 shows an alternative embodiment in which core 10 tasks an accelerator 20 to perform a function which in this case is not a cryptographic function. In such case, when core 10 switches context, for example from secure mode to non-secure mode the secure data that it had tasked accelerator 20 with processing needs to be saved so that the task that is interrupted by this context switch can be resumed later. In this case, accelerator 20 is not a crypto-engine and thus, it instructs a separate cryptographic unit 50 to which it is linked by a dedicated communication line 52 to encrypt the secure data that it was processing. The cryptographic unit 50 comprises a random number generator 52 that is used by the cryptography unit to generate a random number on reset. This random number is stored as a session key 54 and is used for encrypting the secure data that accelerator 20 sends to it. In this embodiment, cryptography unit further generates a hash value from the unencrypted data prior to encrypting it and this hash value is encrypted via the cryptography unit using session key 54 along with the encrypted data. In some embodiments rather than having the overhead of a true random number generator a pseudo random number generator may be used. This takes a set of existing signals and generates a number from the combination of signals. The combination of signals must of course be a secret combination.

This encrypted data along with the encrypted hash value is then stored out to memory along with the state of the accelerator 20 and the non-secure data in much the same way as occurred for FIG. 1.

Although in these embodiments the secure data is encrypted prior to storing it, in some embodiments the hash can be generated and encrypted and the data stored unencrypted along with the encrypted hash. This enables a user to know if the data has been tampered with. In such a case the secure data is accessible to the non-secure side, but it cannot be changed without the system knowing. This can be useful where the security of the system could be compromised by the use of secure data that has been tampered with in the further processing device, but not by the viewing of this data.

When the core switches back to secure state it signals to the accelerator 20 that the task that it was performing should be resumed. At this point, the stored state and data is retrieved from memory 30 and the encrypted data and hash value are sent to cryptography unit 50. The encrypted data is then decrypted along with the hash value and a new hash value is generated from the decrypted data. If this new hash value matches the decrypted hash value then the cryptography unit 50 can be assured that the data has not be tampered with and the decrypted data is then sent to accelerator 20. If the hash values do not match that it is an indication that the data has been tampered with and a signal is issued to core 10 to this effect and the process is aborted.

Figure 3:
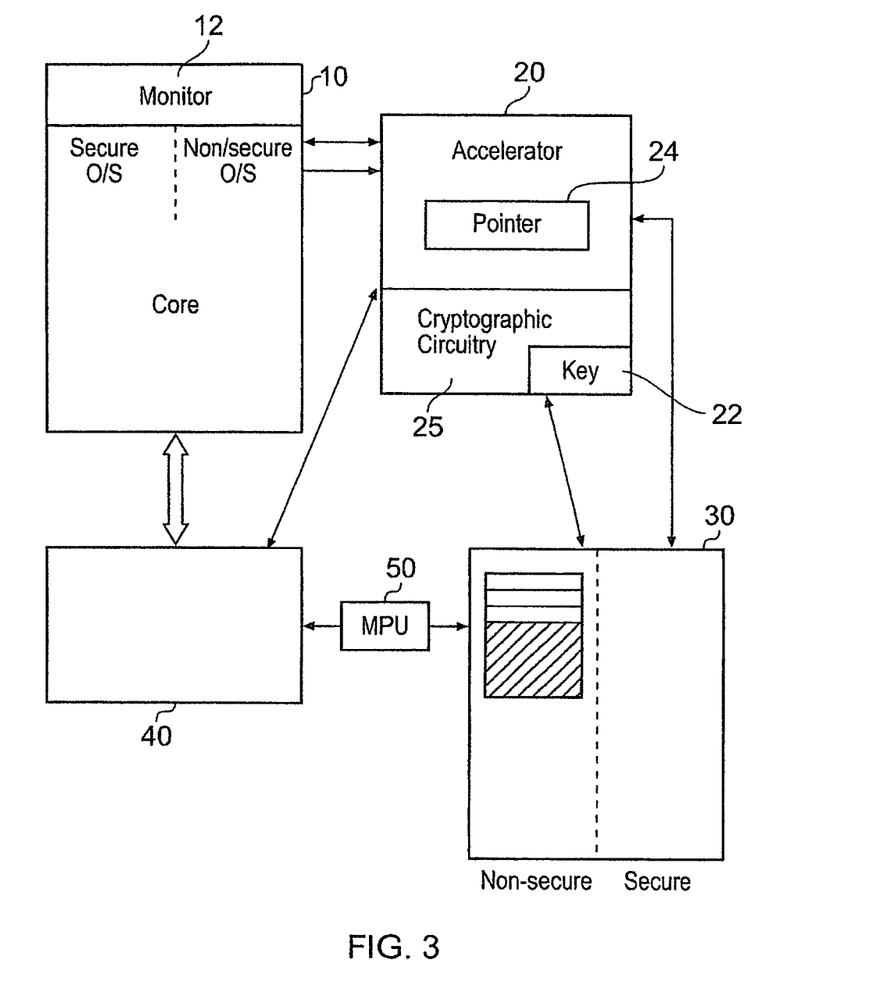
FIG. 3 schematically shows a data processing apparatus according to a further example embodiment.

FIG. 3 shows an alternative embodiment where the accelerator 20 is again not a cryptographic unit. In this case, rather than using a separate cryptographic unit cryptography circuitry 25 is added to accelerator 20 and thus, when core 10 indicates to accelerator 20 that it needs to suspend processing of some secure data the cryptographic circuitry 25 can be used to encrypt the secure data. It is also used in this embodiment to generate a hash value from the unencrypted data and to encrypt this hash value. In this case, as the cryptographic circuitry 25 is relatively simple the hash value and cryptography use the same algorithm. The session key 22 for this cryptography is permanently stored within the accelerator 20 from manufacture.

In other respects this system works in a very similar manner to that of FIGS. 1 and 2.

Figure 4:
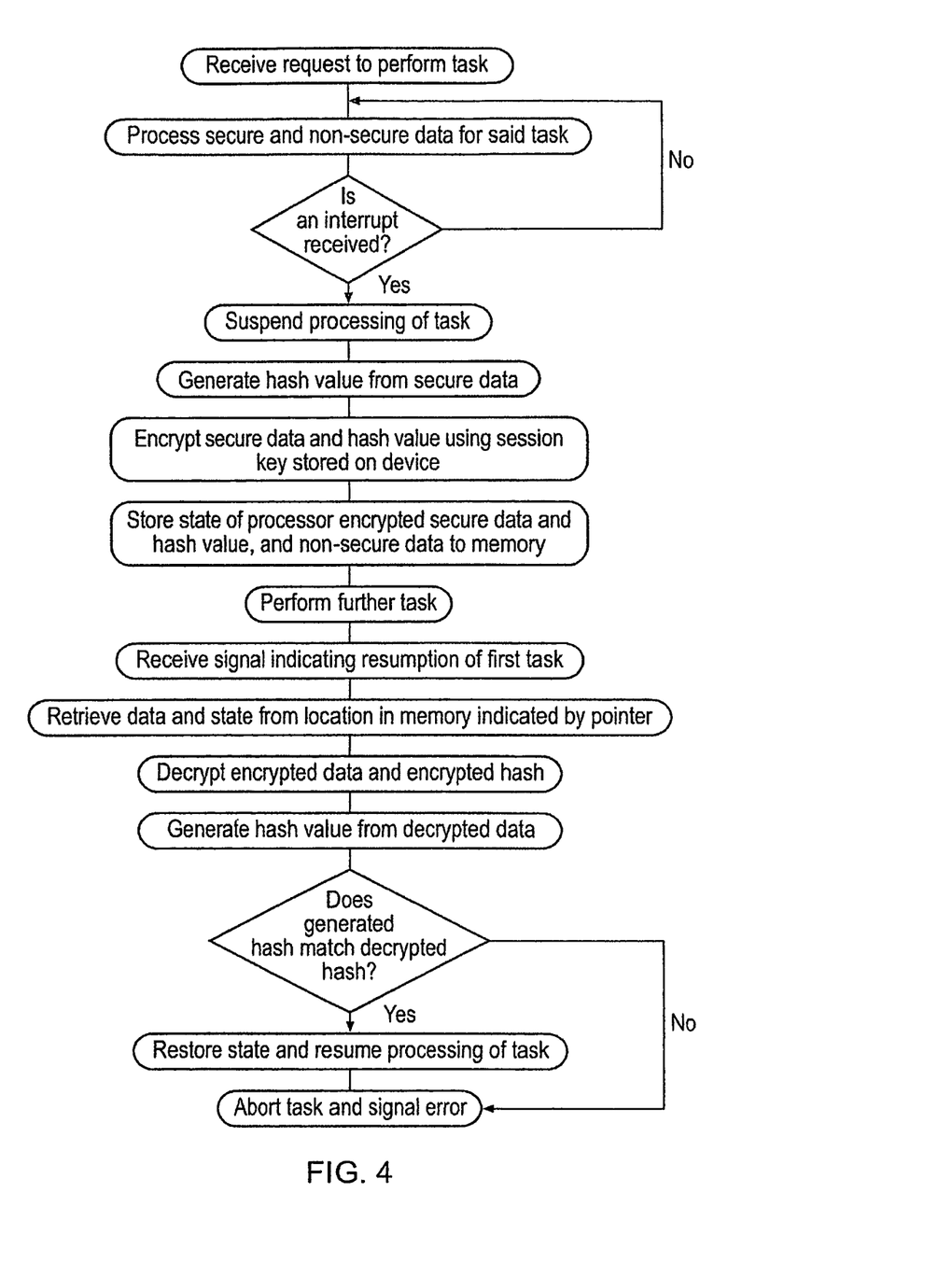
FIG. 4 show a flow diagram illustrating a method according to an example embodiment.

FIG. 4 shows a flow diagram illustrating steps of a method according to an example embodiment. In this method a request to perform task is received from a main processor core at an accelerator. The accelerator then performs the task which involves processing both secure and non-secure data. While doing this it polls for an interrupt and if one is received it suspends processing of the task and generates a hash value from the secure data. It then encrypts the secure data and the hash value using a session key stored on the accelerator. It should be noted that although in this embodiment the hash value is generated from the unencrypted secure data in other embodiments the secure data may be encrypted first and the hash value generated from the encrypted data.

The state of the processor, the encrypted secure data, the hash value and any non-secure data is then stored to memory and the accelerator performs a further task indicated by the interrupt. When this is completed and a signal is received indicating resumption of the interrupted task the data is retrieved, along with the state of the processor from an address in memory where it was stored and the encrypted data and hash are then decrypted. A hash value is then created from the decrypted data and a comparison is made with the stored decrypted hash to see if they match. If they match the state of the processor is restored and processing is resumed and if not the task is aborted and error signal generated.

The above techniques are related to the techniques described in co-pending U.S. patent application Ser. No. 12/003,857 entitled "Providing Secure Services to A Non-Secure Application" and U.S. Pat. No. 7,865,675 entitled "Controlling Cleaning Of Data Values Within A Hardware Accelerator," the disclosure of which are incorporated herein in its entirety.

Further details of different techniques used with the further processing device or hardware (HW) assist in a ARM® data processing apparatus are disclosed below.

The general execution model for user mode HW assist wishing to access secure side data is that a secure session has already been established by the secure side or trustzone (TZ) software before the HW assist attempts to access the secure side.

There are four potential ways of managing a secure session for a HW assist that needs to access data from the secure side.

Default software (SW) entry to secure side with all security in SW. Every time a secure service is required, privilege mode is entered and then an SMC (call to secure side) executed to enter the secure monitor. The secure service is then provided and the program then returns to the user mode application.

Cause an entry in the secure monitor directly on an attempt to access the HW assist. In this mode the secure side is entered every time the HW assist is called and the secure session can be managed directly by the secure side. Secure side SW can also run whatever integrity checking is needed and then call the HW to perform the task. This can be implemented by disabling non-secure access to the HW assist.

Set up a global secure session and provide each process that requires secure access with a pre-defined index into a table of secure values that are available to the non-secure side. Each table value is paired with a hash value to ensure only the process with the correct hash can access a particular table entry. The secure session is set up at process creation time where the available table entries and protecting hash values are calculated. The secure side also writes the address of the secure base table and valid table ranges in to a secure mode only register in the HW assist. To access a secure item from an application program the HW assist is user programmed with a offset and a hash value. The HW assist module then uses these values to access the secure information and check the hash. In this model the secure session is still a global view so the secure monitor does not need to be called on a regular operating system context switch—the offset and hash can be stored in the processes application space on context switch.

Set up a secure session per process. In this model each process effectively has its own secure session. The secure session gets set up when the process is context switched in and the session is closed at the end of the context. Instead of accessing the secure monitor on every access to the HW assist the secure monitor is accessed only on start and end of context. The advantage with this model is that any secure state that is stored in the HW assist can also be saved at context switch time either by the secure monitor directly or by having a secure shadow of a CA_STATUS register. The CA_STATUS register is a register that provides status for the HW assist module, and has privileged access.

A HW assist can be interrupted while running before the task is completed and then restarted at some later time as required. If an interrupt is received while a HW assist is running then the interrupt is entered in the usual ARM® manner without any changes to the HW assist. In the interrupt handler the programmer has the following options:
1. Do nothing to the HW assist and let it continue running. Note that the system programming of the core must ensure that the HW assist still sees that correct view of memory (i.e. the page tables have not been changed).
2. Temporarily suspend the HW assist but not use the HW assist for anything else. (MSUSPEND)
3. Suspend the HW assist and save any dirty state back to memory so the HW assist can be used by something else. (MSUSPENDC)

Figure 5:
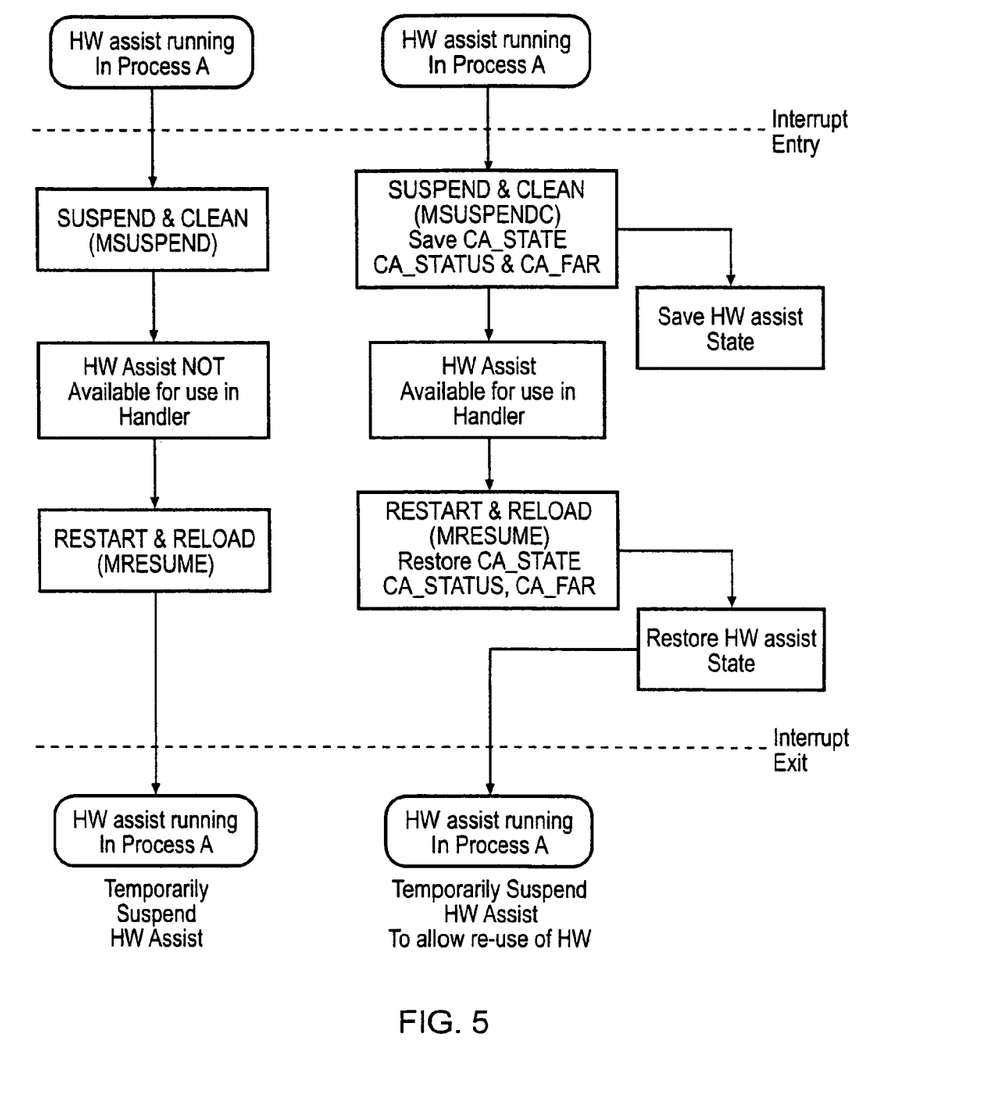
FIG. 5 shows the control flow for suspending and resuming hardware assists on interrupt.

In the case of (2) & (3) once the interrupt handler is complete the HW assist is restarted with a resume command. For (2) execution restarts from where it left off, whereas in (3) the intermediate state must be reloaded back to the HW assist first before execution continues. FIG. 5 shows the control flow for both these cases. In this figure the CA_STATE register is a register that contains a pointer to the descriptor for the HW assist module and has privileged or user access.

For a generic interrupt handler the broadcast forms of MSUSPEND and MRESUME can be used to suspend and resume all HW assist. For more specialized applications individual HW assist modules can be suspend and resumed independently (by supplying the logical address of the HW assist to control).

There are three basic classes of exceptions that need to be handled:
    User errors—which are handled by user mode SW
    Privileged system errors—system errors that are signaled to the operating system for handling Secure errors—errors caused by accessing the secure side signaled to the secure monitor.

By default the privilege and security errors are signaled to the core via an interrupt for further handling. It is expected that user mode errors are handled by the user application software checking a status error bit in a HW assist register (e.g. IUE bit of the CA_Status register). The architecture also supports allowing user mode errors to signal and interrupt the core if required but this will incur the cost of dealing with an operating system.

In cases where multiple exceptions can be active from different privilege levels shadow control registers are provided to store exception information. For example if secure and user memory faults can occur then the FAR and CA_STATUS register must have a shadow in the secure side. The FAR register has privileged access and provides the memory address that faulted.

The basic operations required to support context switching are similar to the basic interrupt handling, i.e. suspending and resuming HW assist operation and cleaning dirty state from HW assist modules. Context switching can be broken in two parts
  Switching a old Process out
  Switch a new Process in
For each of these there are two possibilities
  Strict—do the switch immediately
  Lazy—only do save the state if someone else actually wants to use the HW assist.

The latter is lower power because it only saves the state when necessary but is more complicated to implement.

Figure 6:
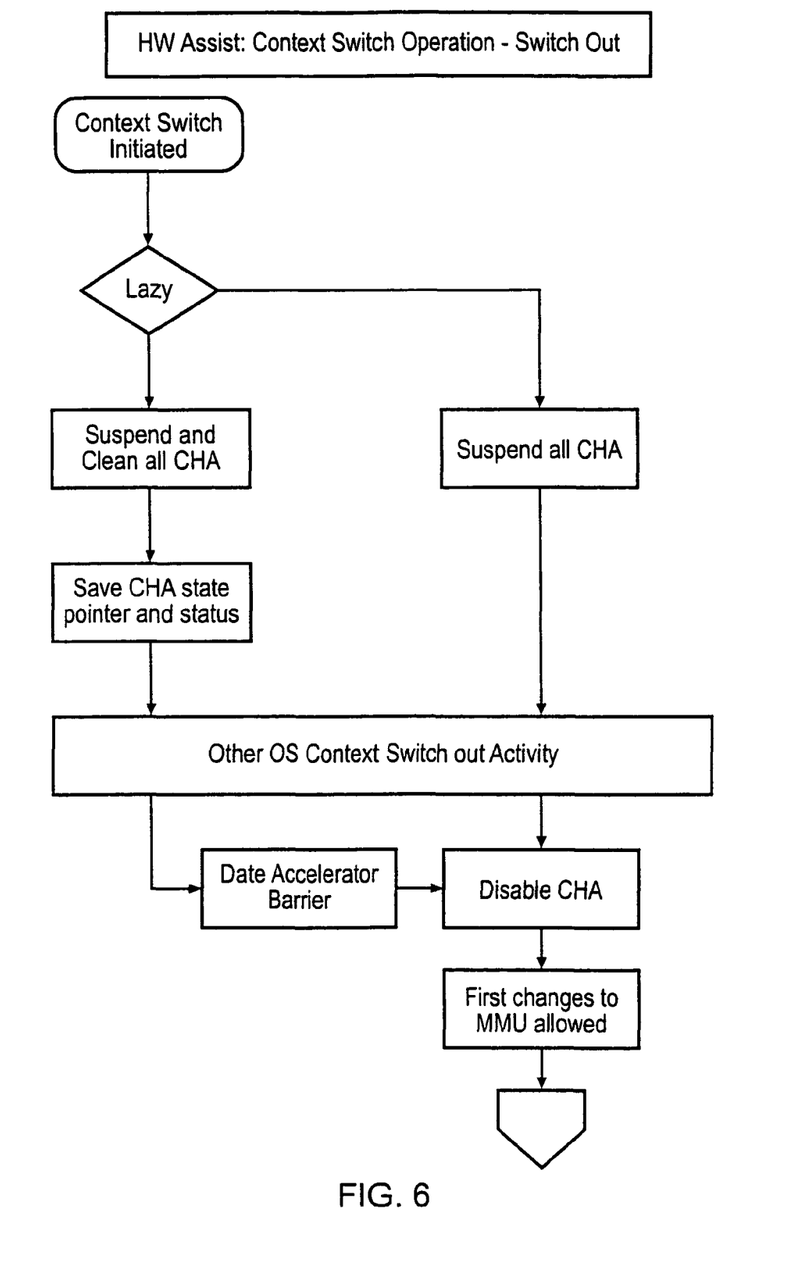
FIG. 6 shows a flow diagram for context switching out.

Note: the traditional lazy context switch (e.g. as used in VFP) does not switch in the new context until the HW is accessed by the new process. In this technique if the new context has a HW assist that was suspended then it needs to restart as soon as context is restored not wait until the first new access to the HW in the new context, FIG. 6 shows the generic flow for switching the context for a HW assist module (CHA). If the context switch is not lazy then the HW assist is suspended and cleaned by using a MSUSPENDC and the pointer to the descriptor, the status register and FAR for each enabled HW assist is saved. In the case of lazy context switch the HW assist is just suspended without saving any state. In both cases the operating system can then proceed to do other context switch clean up while waiting for the HW assist to stop (and potentially clean). Just before the page table entries need to be changed the operating system executes a Data accelerator barrier (DAN) to make ensure all HW assist have finished suspending and then all HW assist are disabled in HACR. Context switch out then continues as normal.

It is possible to refine the generic context switch out at the cost of more analysis by the operating system. For example If the HW assist module is not currently enabled then there is no process context to save and nothing needs to be done.

If the HW assist is enabled but not running—no dirty state potentially needs saving.

May choose to allow HW assist to complete rather than suspending it—this ensures all dirty data is back in memory also.

Figure 7:
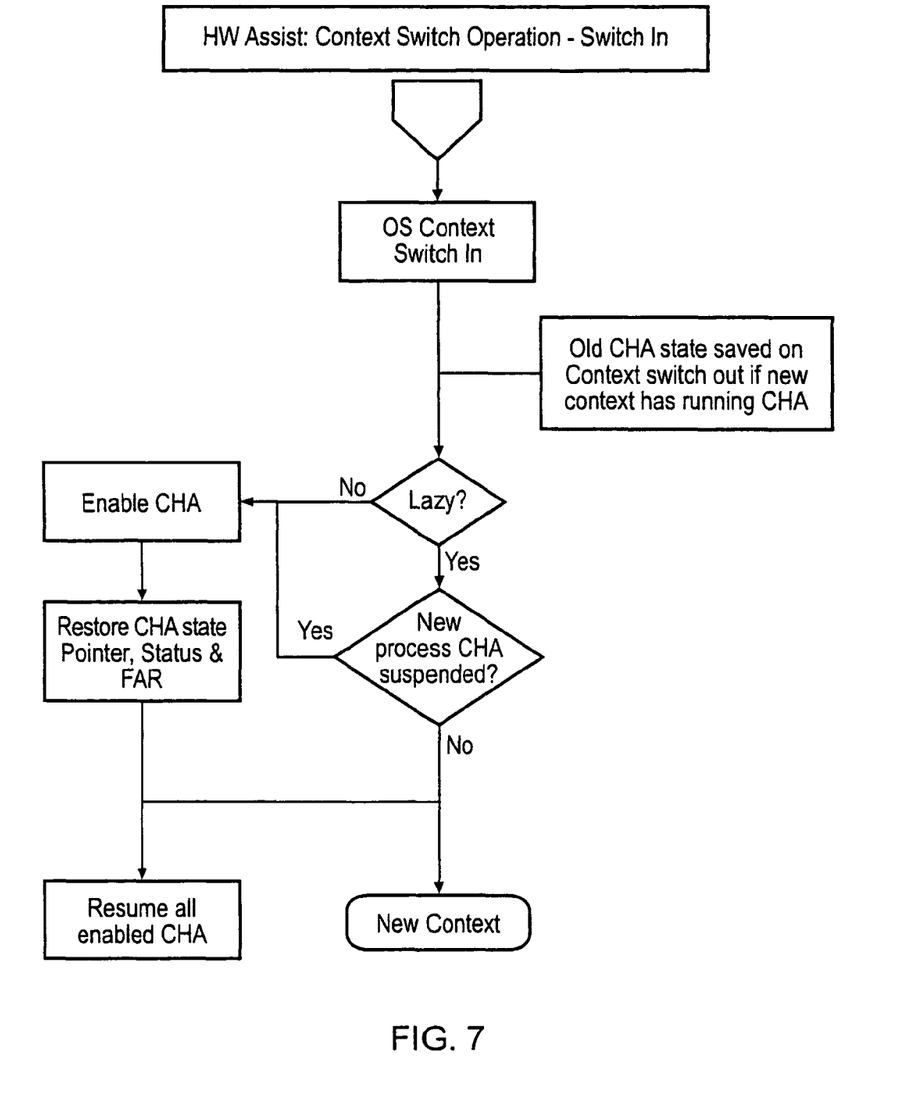
FIG. 7 shows a flow diagram for context switching a process into a hardware assist module.

When switching a new process into a HW assist module the first step is to enable the HW assist module. After this the descriptor and status registers are reloaded into the HW assist module and a resume all command is issue to resume execution of all enabled HW assist modules. This is shown in FIG. 7.

If a lazy scheme is employed (i.e. the state of the old process has not yet been switched out) the operating system should determine whether the new process has suspended HW assist modules. If the new context is using HW assist then the old state out should be cleaned of the HW assist at context switch time (rather than deferring till it is accessed later)

Deferred Context Switch In

The deferred process state switch waits until the new process attempts to access the HW assist module before saving any state. If the new process does not use the HW assist module then no state needs to be saved.

Figure 8:
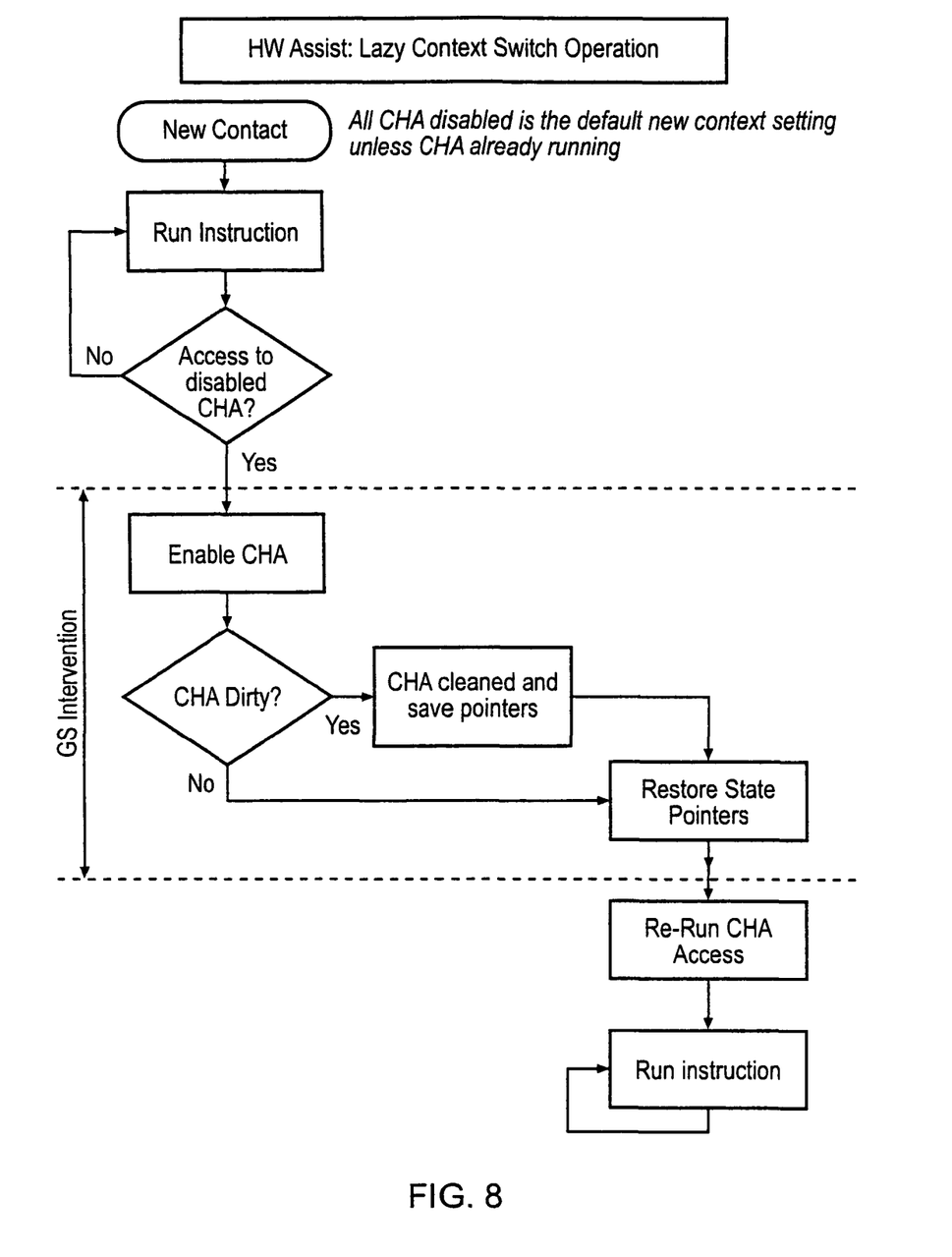
FIG. 8 shows a flow diagram illustrating deferring a hardware assist state save until the first new process access.

To detect when the new process attempts to access the HW assist module the module is disabled at context switch time so that an attempt to use it triggers an event in the operation system that can save and restore the required state (undefined instruction trap). Once the old state has been saved and the new state loaded the command accessing the HW assist can be re-run. This procedure is shown in FIG. 8. It is assumed that suspended HW assist are detected at context switch in time and are automatically restarted rather than waiting for a command to access them.

Note that the operating system must be able to access the user space descriptor of the previous HW assist context to save the HW assist state to the correct location.

Although illustrative example embodiments have been described in detail herein with reference to the accompanying drawings, it is to be understood that the claims are not limited to those example embodiments, and that various changes and modifications can be effected therein by one skilled in the art without departing from the scope and spirit of the claims.

We claim:

1. A data processing apparatus comprising:
a data processor for processing data in a secure and a non-secure mode, said data processor processing data in said secure mode having access to secure data that is not accessible to said data processor in said non-secure mode, and processing data in said secure mode being performed under control of a secure operating system and processing data in said non-secure mode being performed under control of a non-secure operating system; and
a further processing device for performing a task in response to a request from said data processor, said task comprising processing data at least some of which is secure data;
wherein said further processing device is responsive to receipt of a signal to suspend said task to determine whether said signal indicates a deferred process state switch and if not to suspend said task and initiate:
processing of said secure data using a secure key; and
storage of said processed secure data to a non-secure data store; and
if said signal to suspend said task comprises a deferred process state switch, to suspend said task and not perform said processing of said secure data and said storage of said processed secure data until a signal to commence a new task on said further processing device is received; and
said further processing device is responsive to receipt of a signal to resume said suspended task to initiate retrieval of said processed secure data from said non-secure data store, restoration of said processed secure data using said secure key, and resumption of said suspended task unless said suspended task was suspended due to said deferred process state switch and no signal to commence said new task has occurred, in which event said further processing device is responsive to receipt of said signal to resume said suspended task to resume said suspended task without performing said retrieval and restoration of said processed secure data, wherein said secure key is securely stored such that it is not accessible to other processes operating in said non-secure mode, and wherein said processing of said secure data comprises generation of a secure signature from said data and encryption of said secure signature using said secure key, and said restoration of said processed secure data comprises decryption of said encrypted secure signature, generation of said secure signature from said retrieved data, and comparison of said generated secure signature with said decrypted secure signature; and in response to said generated secure signature not matching said decrypted secure signature, said further processing device is configured to issue a signal to said data processor to indicate that said data has been tampered with; and in response to said generated secure signature matching said decrypted secure signature, said further processing device is configured to resume said task using said retrieved data.

2. A data processing apparatus according to claim 1, wherein said processing of said secure data comprises encryption of said secure data using said secure key and said restoring of said processed secure data comprises decryption of said encrypted secure data using said secure key, said secure key being securely stored within a device performing said encryption and decryption.

3. A data processing apparatus according to claim 2, wherein prior to initiating encryption of said data said further processing device initiates generation of a secure signature from said data and initiates encryption of said secure signature and storing of said secure signature along with said secure data; and in response to receipt of said signal to resume said task said further processing device initiates retrieval of said encrypted secure signature and decryption of said encrypted secure signature and following decryption of said encrypted secure data initiates generation of said secure signature from said decrypted encrypted data and comparison of said generated secure signature with said decrypted secure signature; and in response to said generated secure signature not matching said decrypted secure signature said further processing device issues an signal to said data processor to indicate that said data has been tampered with; and in response to said generated secure signature matching said decrypted secure signature said further processing device resumes said task using said decrypted data.

4. A data processing apparatus according to claim 3, wherein said encryption of said secure data and said generation of said signature are performed using a same algorithm.

5. A data processing apparatus according to claim 2, wherein following encrypting of said data said further processing device initiates generation of a secure signature from said encrypted data, and initiates encrypting and storing of said secure signature along with said encrypted secure data; and in response to receipt of said signal to resume said task said further processing device initiates retrieval of said encrypted secure signature and decryption of said encrypted secure signature, and initiates generation of said secure signature from said encrypted data and comparison of said generated secure signature with said decrypted secure signature; and in response to said generated secure signature not matching said decrypted secure signature said further processing device issues a signal to said data processor to indicate that said data has been tampered with; and in response to said generated secure signature matching said decrypted secure signature said further processing device decrypts said encrypted data and resumes said task using said decrypted data.

6. A data processing apparatus according to claim 2, wherein said device performing said encryption and decryption is said further processing device.

7. A data processing apparatus according to claim 6, wherein said further processing device comprises a cryptography processing device, said cryptography processing device performing cryptography processing of data using at least one key, said secure data being encrypted by said secure key comprising said at least one key.

8. A data processing apparatus according to claim 6, wherein said further processing device comprises a write only storage location for said secure key.

9. A data processing apparatus according to claim 2, wherein said device performing said encryption and decryption device is a cryptography processing device connected to said further processing device by a dedicated data communication path that is not accessible to other devices.

10. A data processing apparatus according to claim 2, wherein said further processing device comprises circuitry for performing a function other than cryptography, said further processing device comprising additional cryptography circuitry for encrypting and decrypting said secure data, said further processing device comprising a secure storage location for said secure key.

11. A data processing apparatus according to claim 2, wherein said device performing said encryption and decryption of said secure data comprises a random number generator, said secure key being generated at reset by said random number generator.

12. A data processing apparatus according to claim 1, wherein said secure key is stored in said data processing apparatus under control of said data processor operating in a secure mode such that it is only accessible to said data processor operating in a secure mode.

13. A data processing apparatus according to claim 1, wherein said secure key is set at manufacture and is permanently securely stored in said device performing said encryption and decryption of said secure data such that it is not accessible to other devices.

14. A data processing apparatus according to claim 1, wherein said non-secure data store comprises a non-secure portion of memory.

15. A data processing apparatus according to claim 1, wherein said signal to suspend said task is generated by said data processor in response to an interrupt or an exception.

16. A data processing apparatus according to claim 1, wherein said signal to suspend said task is generated by said data processor in response to a signal indicating a switch of context of said data processor from operation in one of said secure or non-secure mode to the other of said secure or non-secure mode.

17. A data processing apparatus according to claim 1, wherein said request to perform said task is issued from said data processor operating in said non-secure mode.

18. A data processing apparatus according to claim 17, wherein said data processor is configured to issue said request to perform said task to said further processing device in response to program code said data processor is executing in non-secure mode.

19. A data processing apparatus according to claim 1, wherein said further processing device comprises non-programmable hardware.

20. A data processing apparatus according to claim 1, wherein said further processing device is configured to process program code not under control of an operating system.

21. A method of processing data on a data processing apparatus comprising a data processor for processing data in a secure and a non-secure mode, said data processor processing data in said secure mode having access to secure data that is not accessible to said data processor in said non-secure mode, and processing data in said secure mode being performed under control of a secure operating system and processing data in said non-secure mode being performed under control of a non-secure operating system; and a further processing device for performing a task in response to a request from said data processor, said task comprising processing data at least some of which is secure data; said method comprising the steps of:

processing data on said data processor;

sending a request from said data processor to said further processing device to perform a task, said task comprising processing data at least some of which is secure data;

commencing said task on said further processing device sending a signal to suspend said task to said further processing device;

said further processing device determining if said signal to suspend said task comprises a deferred process state switch, and if not:

suspending said task and initiating processing of said secure data using a secure key and storage of said processed secure data to a non-secure data store in response to receipt of said signal to suspend said task; and if said signal comprises said deferred process state switch:

suspending said task and not perform said processing of said secure data and said storage of said processed secure data until a signal to commence a new task on said further processing device is received; and generating a signal from said data processor instructing said further processing device to resume said suspended task;

said further processing device, in response to said signal to resume said suspended task, retrieving said processed secure data from said non-secure data store, restoring said retrieved data using said secure key in response to said signal, and resuming said suspended task, unless said suspended task was suspended due to said deferred process state switch and no signal to commence said new task has occurred, in which event said further processing device is responsive to receipt of said signal to resume said suspended task to resume said suspended task without performing said retrieving and restoring of said processed secure data;

wherein said secure key is securely stored such that it is not accessible to other devices, and wherein said processing of said secure data comprises generation of a secure signature from said data and encrypting said secure signature using said secure key, and said restoring of said retrieved data comprises decrypting said encrypted secure signature, generating said secure signature from said retrieved data, and comparing said generated secure signature with said decrypted secure signature; and in response to said generated secure signature not matching said decrypted secure signature, issuing a signal to said data processor to indicate that said data has been tampered with; and in response to said generated secure signature matching said decrypted secure signature, resuming said task using said retrieved data.

* * * * *